United States Patent [19]

Beach

[11] 3,999,199
[45] Dec. 21, 1976

[54] FILM METERING MECHANISM

[75] Inventor: David Easton Beach, Penfiled, N.Y.

[73] Assignee: Eastman Kodak Company, Rochester, N.Y.

[22] Filed: Dec. 29, 1975

[21] Appl. No.: 644,700

[52] U.S. Cl. .............................................. 354/213
[51] Int. Cl.² ......................................... G03B 1/00
[58] Field of Search ........................... 354/213, 206

[56] References Cited
UNITED STATES PATENTS 3,712,200   1/1973   Beach ............................... 354/213

Primary Examiner—John Gonzales
Attorney, Agent, or Firm—A. B. Pagel

[57] ABSTRACT

A camera for perforated roll film includes a transport mechanism for advancing film along an exposure plane, a metering lever spring biased from an inactive toward an active position to disable the transport mechanism, and a sensing member for detecting the arrival of a perforation in the film at a predetermined position. The metering lever engages the film sensing member and biases the film sensing member into contact with the film. Sensing of a perforation and subsequent movement of the sensing member to a metering position disengages the sensing member from the metering lever and permits movement of the metering lever to its active position. Exposure operation of the shutter actuating mechanism returns the metering lever to its inactive position. A spring acting substantially parallel to the exposure plane is operative to return the sensing member to its sensing position upon subsequent operation of the film transport mechanism.

3 Claims, 6 Drawing Figures

FILM METERING MECHANISM

BACKGROUND OF THE INVENTION

1. Field of the Invention

This invention relates to devices for metering perforated film in a roll film camera and, more particularly, to such devices that sense the presence of a film perforation and selectively lock and release the film transport mechanism.

2. Description of the Prior Art

Devices for metering successive roll film exposures by arresting the film transport mechanism in response to the sensing of perforations or notches precut in the film at specific intervals are old and well known in the art. Commonly assigned U.S. Pat. No. 3,148,605 which issued Sept. 15, 1964 in the names of Dean M. Peterson et al discloses a camera film transport mechanism including a sensing pawl which detects the film perforation and a metering lever which is operable to disable the transport mechanism. Upon sensing the arrival of the perforation at a predetermined location, the sensing pawl is moved a predetermined distance and in so moving releases the metering lever which operates to disable the transport mechanism. In that patent, the shutter release lever is operative to release a high energy lever which is associated with the shutter mechanism and further acts to withdraw the sensing pawl from the perforation. It has been found that, occasionally, the pressure on the film from the sensing pawl, coupled with vibrations in a camera when a high energy lever is rapidly moved, will cause film movement during the exposure interval.

The risk of film movement can be reduced by leaving the sensing pawl in a film perforation during exposure operation of the camera. Such a mechanism is disclosed in U.S. Pat. No. 3,736,854 issued June 5, 1973 in the name of David E. Beach. That patent discloses a mechanism in which the sensing pawl is not removed from the perforation during operation of the shutter mechanism, but remains in the film perforation until after exposure operation and until transport mechanism has begun to advance film. At that time, the sensing pawl is cammed out of the film perforation by cooperation between a cam surface on the sensing pawl and a ramp fixedly mounted in the camera. A return spring acts on the sensing pawl after removal from the film perforation to return the sensing pawl to its perforation sensing position. However, the force of the return spring must be carefully controlled during manufacture or that spring may, in conjunction with undesired vibrations and other forces in the camera, result in metering problems or film motion during exposure operation.

In a pawl-in mechanism, as disclosed in U.S. Pat. No. 3,736,854, the sensing pawl is biased against the trailing edge of the film perforation by the return spring. A strong return spring may overcome gate friction during exposure operation and cause film movement. Reduction of the spring force on the sensing pawl will minimize the tendency for the film to move during exposure operation. However, this may lead to other metering problems. When the sensing pawl is removed from a film perforation and it is desired to return the pawl to its sensing position, the light spring which is urging the pawl in such a direction may not be of sufficient size to overcome the frictional resistance between the sensing pawl and the film surface. The frictional resistance is directly related to the force with urges the sensing pawl into its sensing position in which it detects the presence of a metering perforation in the film. Even if the sensing pawl is moved to its sensing position, continued film movement may drag the sensing pawl to its metering position prematurely.

SUMMARY OF THE INVENTION

It has been found that the problems described above can be eliminated by not biasing the sensing pawl toward the film during exposure operation of the camera and return of the sensing pawl to its sensing position. In such a mechanism, the spring returning the pawl to its sensing position may be made extremely light in force since there will be no direct spring force creating frictional resistance between the sensing pawl and the film surface. The present film metering mechanism provides a sensing pawl which is mounted in a camera housing in a sensing position to enter a film perforation in a film and is movable from that position to a metering position by engagement with the film. A metering lever is spring biased toward a metering position and includes a biasing lug that transmits a portion of that force to the sensing pawl to bias the sensing pawl toward the film. A further light spring is coupled to the sensing pawl, acting in a direction substantially parallel to the exposure plane, to bias the sensing pawl to its sensing position. Upon engagement of a film perforation and movement to its metering position, the sensing pawl is disengaged from the metering lever, permitting the metering lever to disable the film transport mechanism and further removing the spring force biasing the sensing pawl against the film. Subsequent exposure operation of the camera releases the metering lever from the transport mechanism but does not affect the position of the sensing pawl. Subsequent operation of the transport mechanism to advance film within the camera moves the sensing pawl out of the film perforation by engagement of a cam surface with a fixed ramp in the camera. The light spring may now return the sensing pawl to its sensing position, where it is subsequently engaged by the metering lever.

BRIEF DESCRIPTION OF THE DRAWINGS

In the detailed description of the preferred embodiment, reference is made to the accompanying drawings, in which.

DESCRIPTION OF THE PREFERRED EMBODIMENT

Because photographic apparatus is well known, the present description will be directed in particular to elements forming part of, or cooperating more directly with, photographic apparatus in accordance with the present invention. It is to be understood that camera elements not specifically shown or described may take various forms well known to those skilled in the art.

Figure 1:
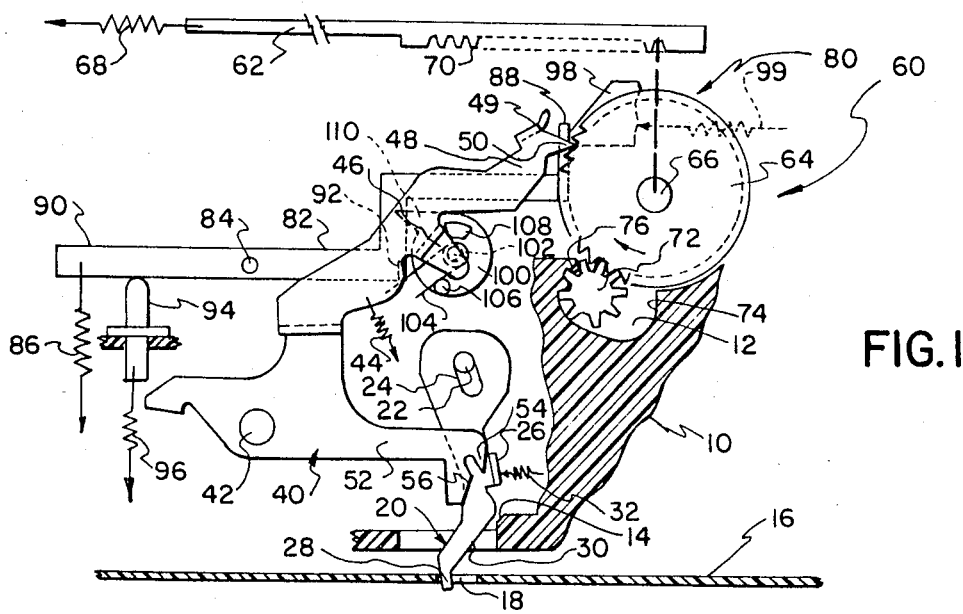
FIG. 1 illustrates the film metering mechanism of the present invention in a metered condition with the transport mechanism locked against further movement.

Referring now to FIG. 1, the camera includes a housing 10, which defines a recess 12 and a ramp 14 and into which a strip of film 16 with perforations 18 along one edge has been loaded. The film may be contained in a cartridge of the type shown in co-assigned U.S. Pat. No. 3,138,081 which issued on June 23, 1964 to Hubert Nerwin. Perforations 18 are located at a predeterined position in the film such as to properly locate a desired frame of the film at an exposure plane of the camera. The camera further includes a sensing pawl 20, a metering lever 40, a transport mechanism 60 and a shutter actuating mechanism, of which a portion is shown at 80. Sensing pawl 20 is movably mounted within the camera by fixed pin 22 which extends into a slot 24 within sensing pawl 20. Sensing pawl 20 further includes a biasing lug 26, a sensing end 28 and a cam surface 30 and is biased toward a sensing position by a spring 32. Spring 32 may be light in force as will be explained in more detail hereinafter and acts in a direction substantially parallel to the exposure plane of the camera and opposite to the direction of film movement within the camera.

Film metering lever 40 is movably mounted within the camera on a fixed pin 42 and is biased by a spring 44 in a clockwise direction. Metering lever 40 further includes a blocking arm 46, a locking arm 48 which includes an unlocking lug 49 and a locking pawl 50, and a biasing arm 52 which includes a biasing lug 54 and a blocking surface 56. Biasing lug 54 is engageable with biasing lug 26 on sensing pawl 20 during certain portions of the operational cycle of the camera.

Transport mechanism 60 includes a film slide 62 and a train of gears which are operable to advance film within the camera and which are coupled to a ratchet 64 which is rotatably mounted within the camera on a fixed pin 66. Slide 62 is movable from its rest position against the bias of a spring 68 by the operator. Such movement is coupled to the camera gear train by a rack 70 on slide 62. Transport mechanism 60 further includes a floating pinion 72 mounted within recess 12 in the camera. One end of recess 12 is defined by a smooth wall 74 while the other end of recess 12 includes a tooth 76 engageable with pinion 72.

Shutter actuating mechanism 80 includes a lever arm 82, which is movably mounted on a pin 84 fixed in the camera and is urged by a spring 86 in a counterclockwise direction. Lever arm 82 includes a shutter control arm 88, an actuating arm 90 and a lug 92. A member 94 is movably mounted in the camera and is urged in a downward direction by a spring 96. Member 94 is movable upwardly in response to operation of a body release lever (not shown) by the photographer. Shutter actuating mechanism 80 further includes a shutter actuator 98, which is urged by a spring 99 into engagement with shutter control arm 88. Shutter actuator 98 may actuate any of the well known shutter mechanisms that are known in the art. Shutter actuator 98 is also engageable with unlocking lug 49 on film metering lever 40 during a portion of the camera operating cycle. Shutter actuating mechanism 80 further includes a blocking member 100 which is rotatably mounted on a pin 102 fixed within the camera. Blocking member 100 is biased by a spring 104 which engages lug 92 on lever arm 82 and a lug 106 on blocking member 100. Blocking member 100 includes a stop 108 and a lug 110. Stop 108 is engageable with blocking arm 46 on film metering lever 40 and lug 110 is engageable with lug 92 during portions of the camera operating cycle, as is described in more detail hereinafter.

As shown in FIG. 1, locking pawl 50 on film metering lever 40 is engaged with ratchet 64, thereby preventing operation of transport mechanism 60 of the camera. Simultaneously, to aid locking pawl 50, pinion 72 is engaged between tooth 76 and ratchet 64. Sensing pawl 20 is engaged with a perforation 18 in film 16, with sensing end 28 extending through perforation 18. Biasing lug 26 is not in engagement with biasing lug 54 and thus only spring 32 is acting upon sensing pawl 20. Spring 32 urges sensing end 28 into continued engagement with the trailing end of perforation 18 and thus provides a light frictional force to retain sensing end 28 within perforation 18. Shutter control arm 88 is engaged with and maintains shutter actuator 98 in its energized condition. Actuating arm 90 is engaged with member 94. Stop 108 is engaged by the side of blocking arm 46, thereby maintaining spring 104 in an energized condition by engagement with lug 92 and lug 106.

Figure 2:
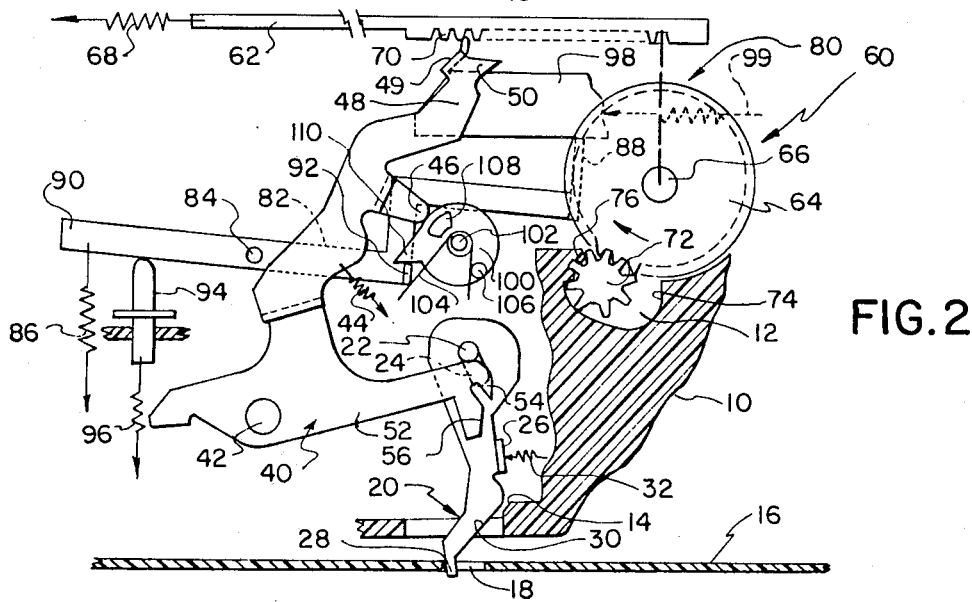
FIG. 2 illustrates the film metering mechanism after exposure operation of the camera.

For exposure operation of the camera, the photographer depresses the body release lever (not shown) causing upward motion of member 94 and consequent clockwise rotation of lever arm 82 about pin 84. Shutter control arm 88 is disengaged from shutter actuator 98, permitting shutter actuator 98 to move to the left toward the position shown in FIG. 2. Such movement of shutter actuator 98 may initiate camera shutter operation in any well known manner. During such movement, shutter actuator 98 also engages unlocking lug 49 of film metering lever 40 and rotates film metering lever 40 in a counterclockwise direction about pin 42 against the bias of spring 44. Locking pawl 50 is thereby removed from engagement with ratchet 64 and transport mechanism 60 is prepared for advancement of film 16 within the camera. Rotation of metering lever 40 under the urging of shutter actuator 98 continues until blocking arm 46 is disengaged from stop 108 and biasing arm 52 is brought into engagement with pin 22 within the camera, as in FIG. 2. Sensing pawl 20 remains in its metering position with sensing end 28 extending into a perforation 18. Blocking member 100 rotates in a counterclockwise direction under the bias of spring 104 until lug 110 engages lug 92, bringing stop 108 into the path of return movement of blocking arm 46. Upon release of the body release lever, member 94 is moved downwardly by spring 96 and disengaged from lever arm 82. However, lever arm 82 is prevented from rotating in a counterclockwise position about pin 84 by engagement of shutter control arm 88 with shutter actuator 98. Moreover, film metering lever 40 is held away from its metering position by shutter actuator 98 and, thereby, biasing lug 54 is held out of the path of subsequent movement of sensing pawl 20 under the urging of spring 32.

Figure 3:
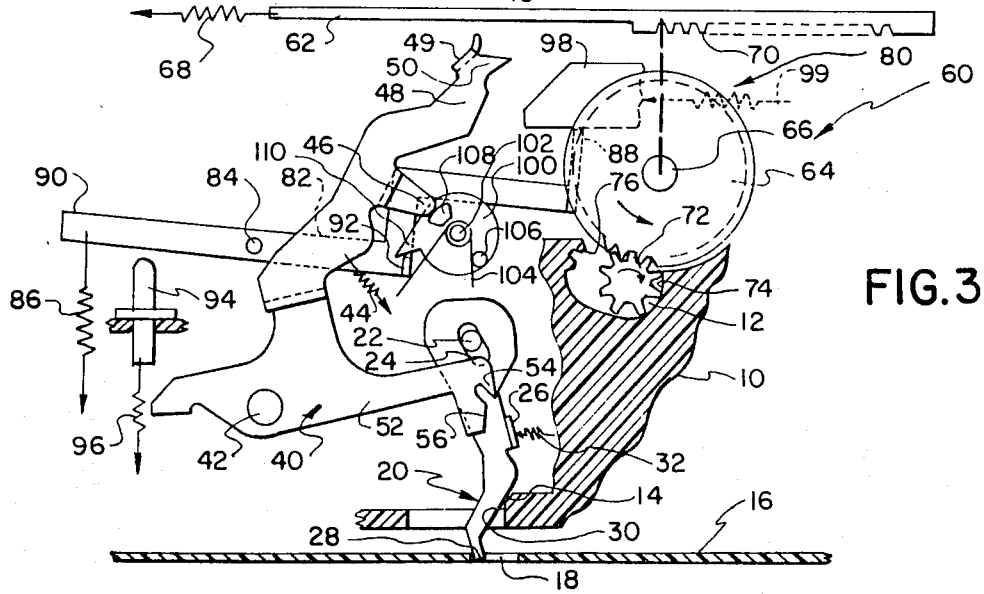
FIG. 3 illustrates the film metering mechanism at the beginning of film advancement in the camera.
Figure 4:
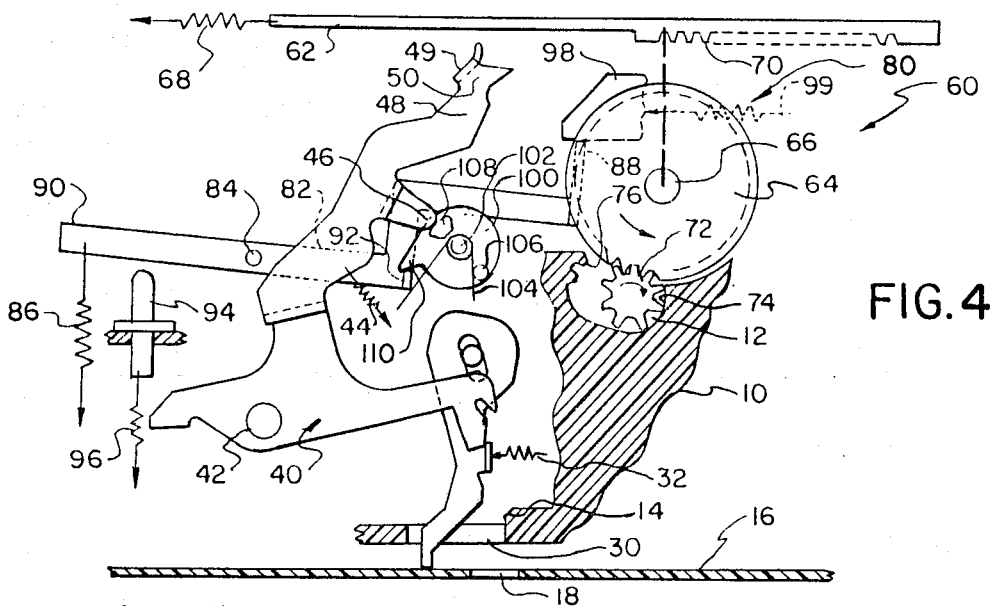
FIG. 4 illustrates the film metering mechanism with the sensing pawl returned to its sensing position.

When the camera operator wishes to advance film within the camera by use of transport mechanism 60, the operator engages and moves film slide 62 to the right against the bias of spring 68. Such movement is coupled through rack 70 and the camera gear train to move film 16 toward the right, as is illustrated in FIG. 3, and to rotate ratchet 64 in a counterclockwise direction. During such rotation, pinion 72 moves to the right and freely rotates against smooth wall 74. The trailing edge of perforation 18 engages sensing end 28 and rotates sensing pawl 20 in a counterclockwise direction about pin 22. Upon sufficient movement, cam surface 30 on sensing pawl 20 engages ramp 14 and sensing pawl 20 is cammed out of perforation 18 in film 16. Movement of film slide 62 is also coupled to shutter actuator 98 in any well known manner and moves shutter actuator 98 toward its energized position against the bias of spring 99. Note that, while shutter actuator 98 is disengaged from unlocking lug 49, clockwise movement of film metering lever 40 is prevented by stop 108 on blocking member 100 which engages blocking arm 46 and thus biasing lug 54 is held out of the path of sensing pawl 20. When sensing end 28 is completely removed from perforation 18, spring 32 is operative to move sensing pawl 20 toward a sensing position as illustrated in FIG. 4. Since there is no spring force acting to urge sensing pawl 20 against film 16, because stop 108 prevents metering lever 40 from moving clockwise, a light spring force is sufficient to cause movement of sensing pawl 20 against the direction of travel of film 16. Such movement continues until biasing lug 26 engages blocking surface 56.

Figure 5:
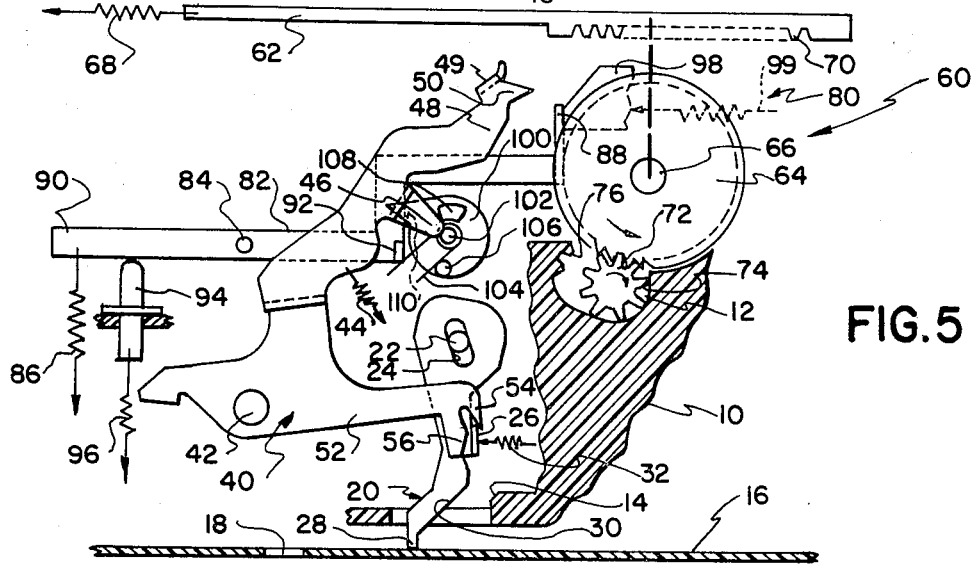
FIG. 5 illustrates partial film advancement with the sensing pawl biased into contact with the film.

Operation of transport mechanism 60 is also operative to return shutter actuator 98 to its energized position. During movement of shutter actuator 98, shutter control arm 88 initially maintains lever arm 82 in its clockwise position and thus provides a biasing force on spring 104 through lug 92 to urge blocking member 100 in a counterclockwise direction and maintain lug 110 in engagement with lug 92. When shutter actuator 98 is moved to its energized position, lever arm 82 rotates counterclockwise under the urging of spring 86, thereby moving shutter control arm 88 into its latching position. Lug 92 is also moved and, by engagement with the lug 110, rotates blocking member 100 in a clockwise direction. Such rotation removes stop 108 from engagement with blocking arm 46 and permits further rotation of metering lever 40 in a clockwise direction about pin 42, under the urging of spring 44. Rotation of metering lever 40 brings biasing lug 54 into engagement with biasing lug 26 on sensing pawl 20 and urges sensing pawl 20 into a sensing position in contact with film 16 as is shown in FIG. 5. Rotation of metering lever 40 also brings the side of blocking arm 46 into engagement with stop 108 and further rotates blocking member 100 in a clockwise direction, disengaging lug 110 from lug 92 on lever arm 82 and further compressing spring 104.

Figure 6:
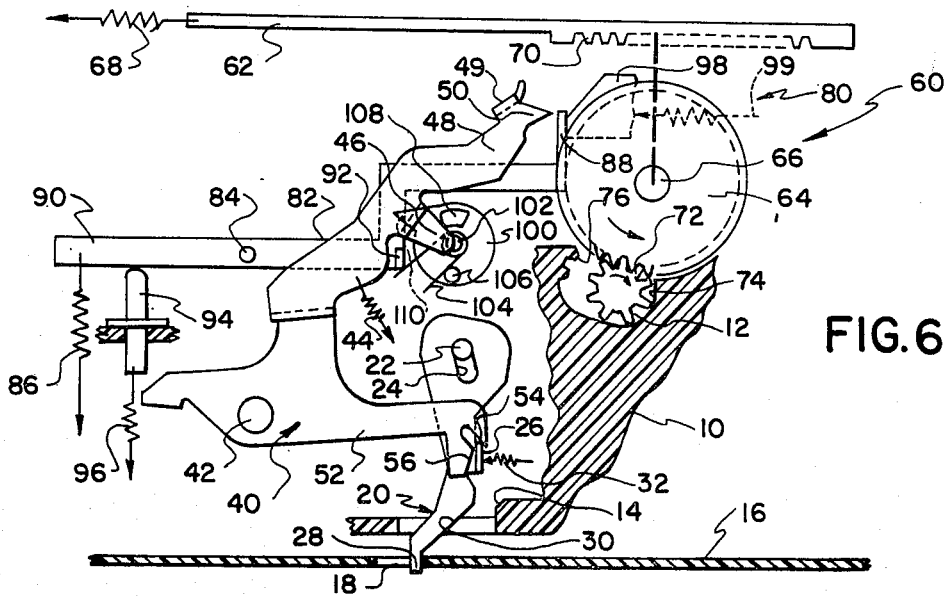
FIG. 6 illustrates movement of the sensing pawl to engage a film perforation.

Continued movement of film 16 within the camera brings a perforation 18 beneath sensing end 28 of sensing pawl 20. Sensing end 28 is urged into perforation 18 by the biasing force of spring 44 as presented against sensing pawl 20 by engagement of biasing lug 54 and biasing lug 26. However, movement of sensing pawl 20 transverse to film 16 is limited by the position of pin 22 in slot 24 and, while not permitting sufficient movement of metering lever 40 about pin 42 to lock transport mechanism 60, does bring locking pawl 50 into proximity with ratchet 64 as shown in FIG. 6. Continued movement of film 16 brings the trailing end of perforation 18 into engagement with sensing pawl 20 and rotates sensing pawl 20 into a counterclockwise direction about pin 22 until biasing lug 26 disengages from biasing lug 54 on film metering lever 40. Such disengagement permits further clockwise rotation of metering lever 40 about pin 42 under the bias of spring 44, bringing locking pawl 50 into engagement with ratchet 64 of transport mechanism 60 and thereby preventing further actuation of transport mechanism 60. When film slide 62 is now allowed to return to the left under the urging of spring 68, ratchet 64 is rotated in a reverse clockwise direction a distance of approximately two teeth. Such movement brings pinion 72 into engagement with tooth 76 to provide clearance for locking pawl 50 to disengage from ratchet 64 upon counterclockwise rotation of film metering lever 40 during the next operational cycle. The mechanism has now returned to the position illustrated in FIG. 1 and is ready for subsequent exposure operation of the camera.

The invention has been described in detail with particular reference to a preferred embodiment thereof, but it will be understood that variations and modifications can be effected within the spirit and scope of the invention.

I claim:
1. In a camera adapted to receive and use film of the type having metering perforations at predetermined intervals, said camera including a transport mechanism for advancing film along the camera exposure plane, a metering mechanism having an active condition disabling said transport means and an inactive condition, and means operative for placing said metering mechanism in its inactive condition; an improvement comprising:
   a sensing pawl movable from a sensing position on one side of the exposure plane to an extended position transversing said exposure plane and further movable, in response to movement of a film within the camera, from said extended position to a metering position;
   means operatively associated with the metering mechanism while in its inactive condition for applying a biasing force to said pawl to urge said sensing pawl toward said extended position and for disengaging said sensing pawl from said biasing force upon movement of said sensing pawl to said metering position; and
   means, including a spring acting substantially parallel to the exposure plane of said camera, for returning said sensing pawl to said sensing position during return of said metering mechanism to its inactive condition.

2. In a camera adapted to receive and use film of the type having metering perforations at predetermined intervals, said camera including: a transport mechanism for advancing film along the camera exposure plane; a metering mechanism including a metering lever movable between an inactive position and an active position wherein said metering disables the transport mechanism and a spring coupled to the metering lever to urge the metering lever to its active position; and means for returning the metering lever to its inactive condition; an improvement comprising:
   a sensing pawl movable from a sensing position in contact with a received film to an extended position in which a portion of said sensing pawl extends into a perforation in the film and further movable, in response to movement of a film within the camera, from said extended position to a metering position;
   means, operatively coupling said sensing pawl and the metering mechanism when the metering lever is in its inactive condition, for urging said sensing pawl from said sensing position to said extended position, said sensing pawl being disengaged from said urging means upon movement of said sensing pawl to said metering position; and
   a spring engaged with said sensing pawl and acting substantially parallel to the camera exposure plane to urge said sensing pawl toward said sensing position without urging said sensing pawl toward said extended position.

3. In a camera adapted to receive and use film of the type having metering perforations at predetermined intervals, said camera including:
- a transport mechanism for advancing film along the camera exposure plane;
- a metering lever movable between an inactive position and an active position in which the metering lever engages and locks the transport mechanism, the metering lever including a biasing lug;
- spring means for urging the metering lever toward its active position; and
- means, including a movable member, for moving the metering lever to its inactive position against the urging of the spring means;

an improvement comprising:
- a sensing pawl movably mounted in said camera for movement from a sensing position in contact with a received film to a metering position, said sensing pawl being engaged by the biasing lug when the metering lever is in said inactive position and being urged by the biasing lug to said sensing position and said sensing pawl being disengaged from the biasing lug after sensing of a metering perforation and during movement of said sensing pawl to said metering position in response to movement of the film; and
- a spring engaged with said sensing pawl and acting substantially parallel to the camera exposure plane to urge said sensing pawl from said metering position toward said sensing position, said sensing pawl being free from any force acting substantially perpendicular to the camera exposure plane during movement of said sensing pawl from said metering position to said sensing position.

* * * * *